United States Patent

Bezerie

[15] 3,642,233
[45] Feb. 15, 1972

[54] SYSTEM FOR THE OPTICAL AUTOMATIC AND AUTONOMOUS GUIDING OF SELF-ROTATING MISSILES

[72] Inventor: Jean Pierre Bezerie, Ville D'Avray, France
[73] Assignee: Societe Anonyme De Telecommunication, Paris, Seine, France
[22] Filed: Dec. 29, 1969
[21] Appl. No.: 888,724

Related U.S. Application Data

[63] Continuation-in-part of Ser. No. 460,621, June 2, 1965, abandoned.

[30] Foreign Application Priority Data

June 4, 1964 France...................................977052

[52] U.S. Cl..........................................244/3.16, 102/70.2 P
[51] Int. Cl.....................F41g 7/00, F41g 9/00, F42b 13/30
[58] Field of Search...............................244/3.16; 102/70.2 P

[56] References Cited

UNITED STATES PATENTS

| | | | |
|---|---|---|---|
| 2,931,912 | 4/1960 | Macleish | 244/3.16 UX |
| 2,942,118 | 6/1960 | Gedance | 244/3.16 UX |
| 2,989,640 | 6/1961 | Turck | 244/3.16 X |
| 3,010,677 | 11/1961 | Guthrie et al. | 244/3.16 X |
| 3,021,096 | 2/1962 | De Mott | 244/3.16 |
| 3,263,084 | 7/1966 | Boydell | 250/203 |
| 3,239,674 | 3/1966 | Aroyan | 102/70.2 P |

Primary Examiner—Benjamin A. Borchelt
Assistant Examiner—Thomas H. Webb
Attorney—Nathaniel L. Leek

[57] ABSTRACT

An automatic and autonomous optical guidance system for an autorotative missile to be directed towards a target emitting radiations, the missile having a single flight-control rudde. operable at each revolution of the missile about its axis of rotation; comprising an optical target position detecting means for producing, at each revolution of the missile, signals which are a function of the deviation between the autorotational axis of the missile and the missile-target direction; control signal producing means connected to the optical detecting means for generating, at each revolution of the missile, a control energy; and motor means connected to the control signal producing means in order to be supplied thereby and positively coupled with the single flight-control rudder in order to guide the missile, at each revolution thereof, as a function of the deviation between its autorotational axis and the missile-target direction; the optical target position detecting means comprising an optical modulator formed of a plane support provided, radially from a point of origin, with a succession of opaque sectors and transparent sectors arranged in alternate sequence, the optical modulator being disposed in the image plane of an objective lens which projects the target image on to the image plane, and, a photoelectric cell located downstream of the optical modulator for receiving light pulses generated by a relative displacement between the target and the optical modulator, the photoelectric cell converting the light pulses into electric signals which are transmitted to a frequency discriminator producing an output voltage which is a function of the frequency of the pulses, thereby a function of the angular deviation of the target with respect to a reference direction constituted by the optical axis of the optical target position detecting means, the voltage actuating, the control signal producing means; the relative displacement between the optical modulator and the target image being produced by the autorotational movement of the missile.

8 Claims, 30 Drawing Figures

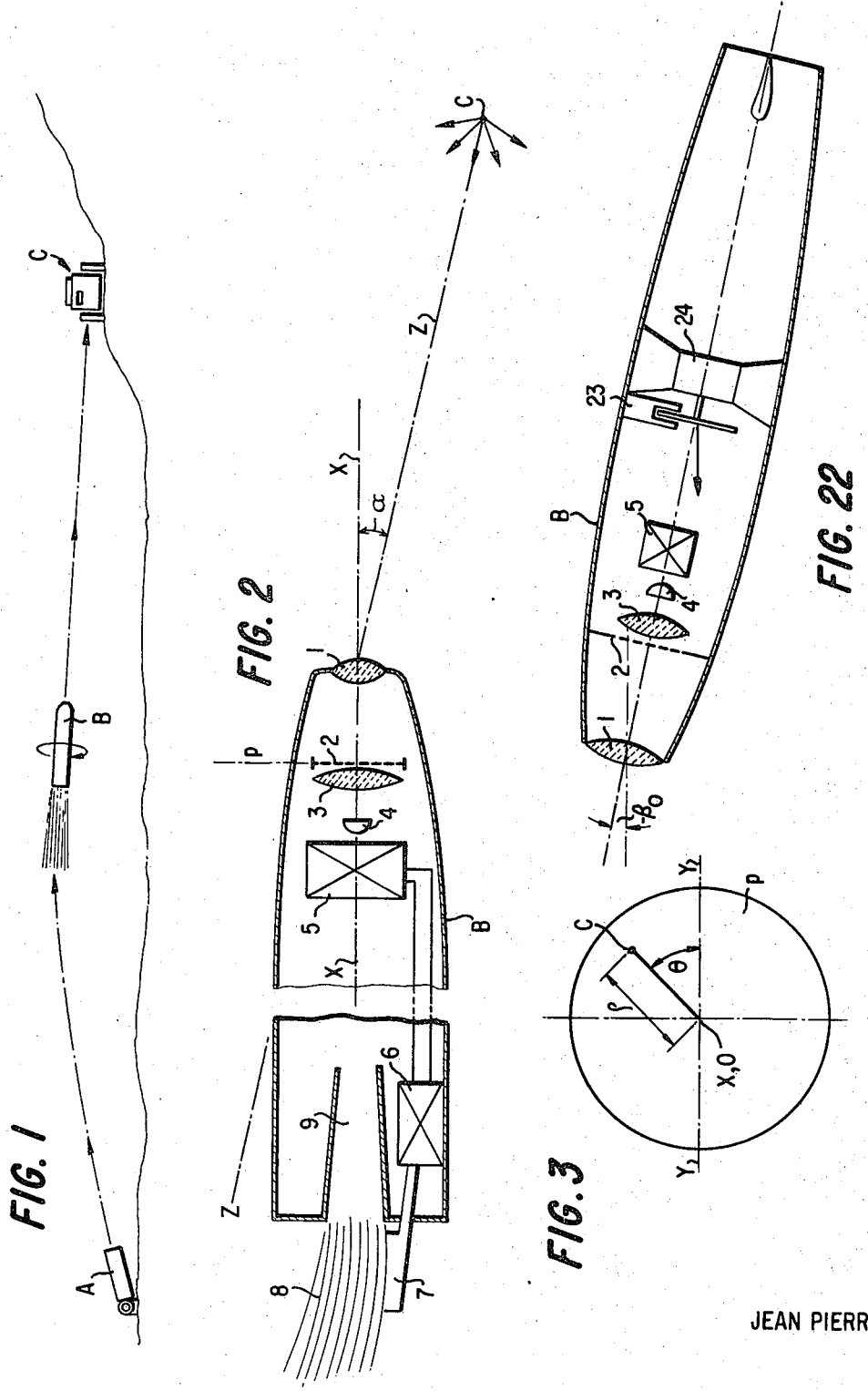

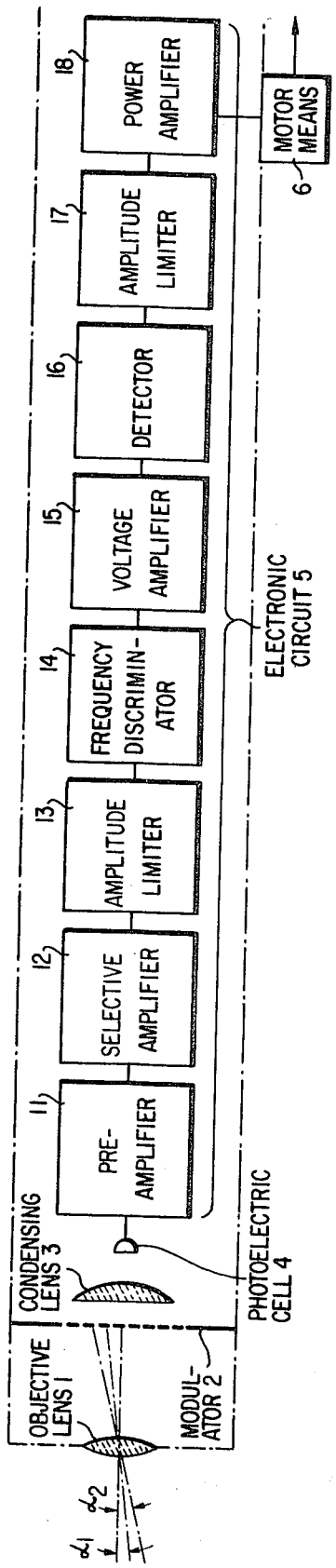
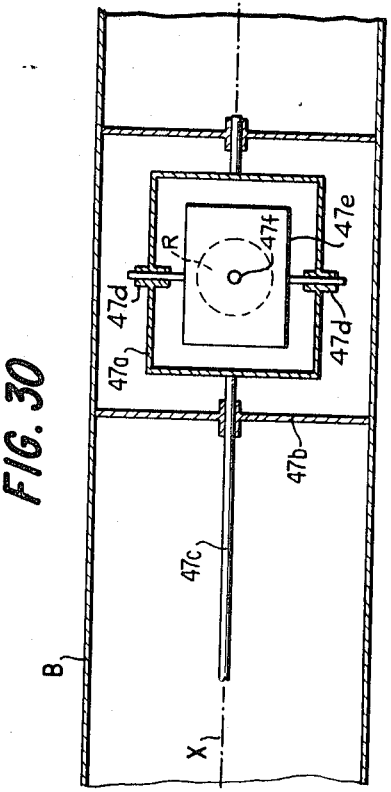
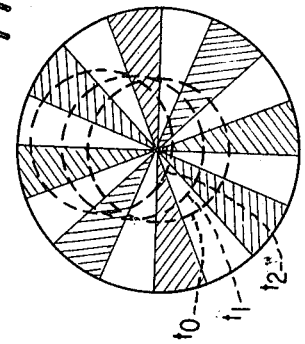
FIG. 4
FIG. 30
FIG. 29
INVENTOR
JEAN PIERRE BEZERIE

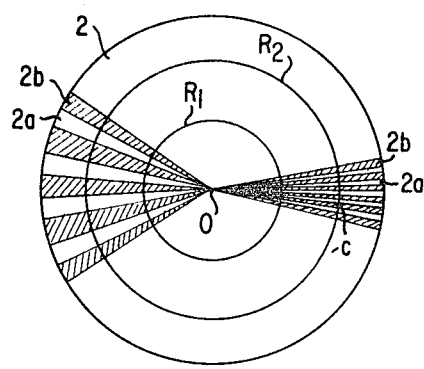
FIG. 5
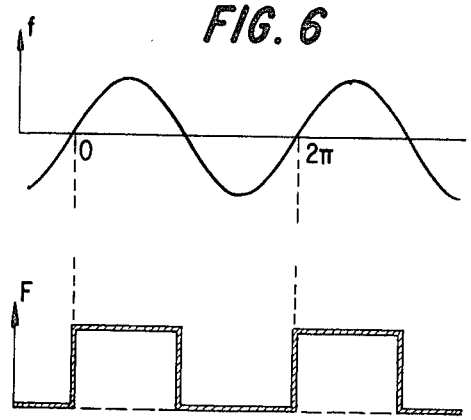
FIG. 6
FIG. 7
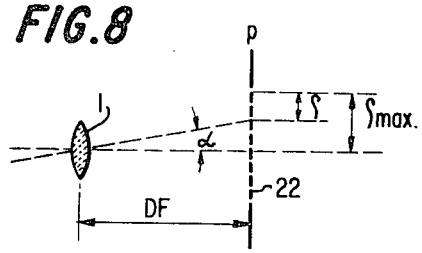
FIG. 8
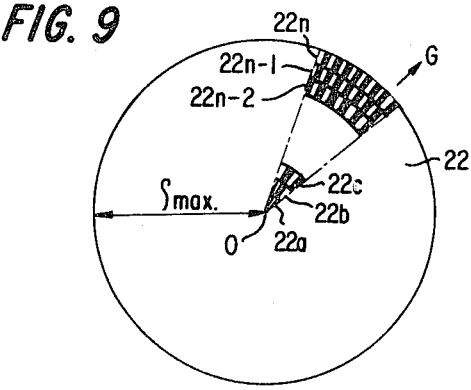
FIG. 9
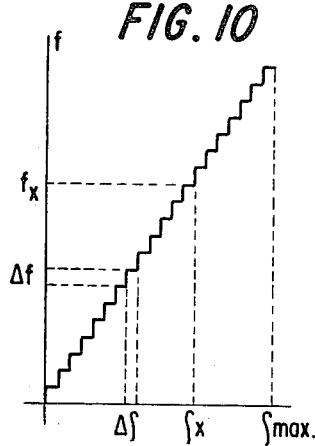
FIG. 10
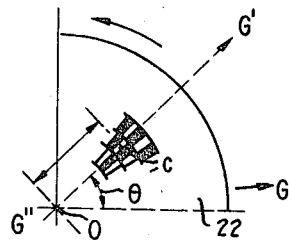
FIG. 11
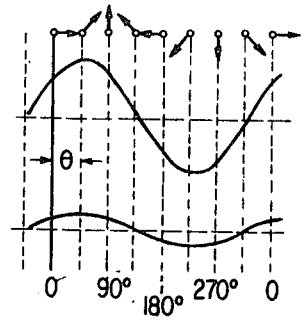
FIG. 12
INVENTOR
JEAN PIERRE BEZERIE

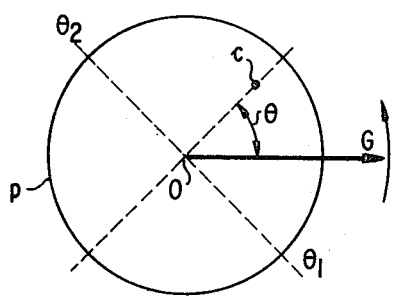
FIG. 13
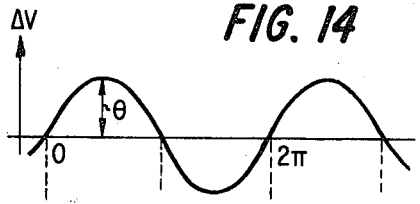
FIG. 14
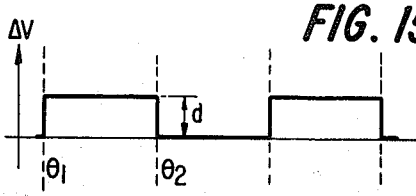
FIG. 15
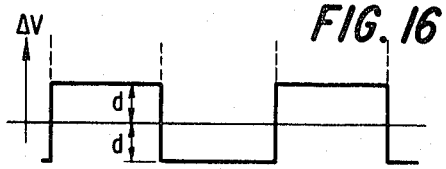
FIG. 16
FIG. 17
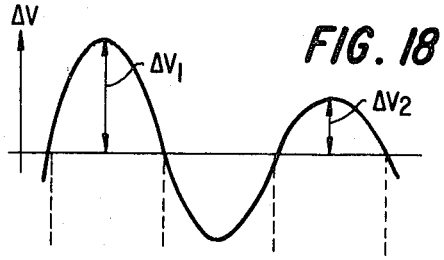
FIG. 18
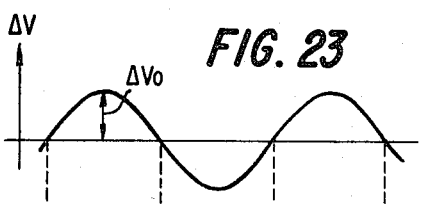
FIG. 23
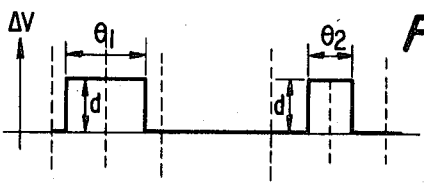
FIG. 19
FIG. 24
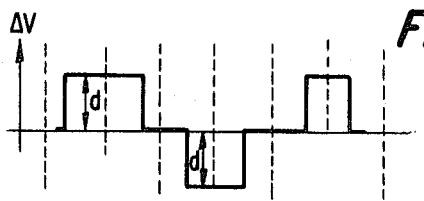
FIG. 20
FIG. 21
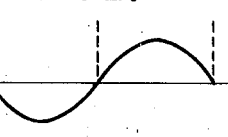
INVENTOR
JEAN PIERRE BEZERIE

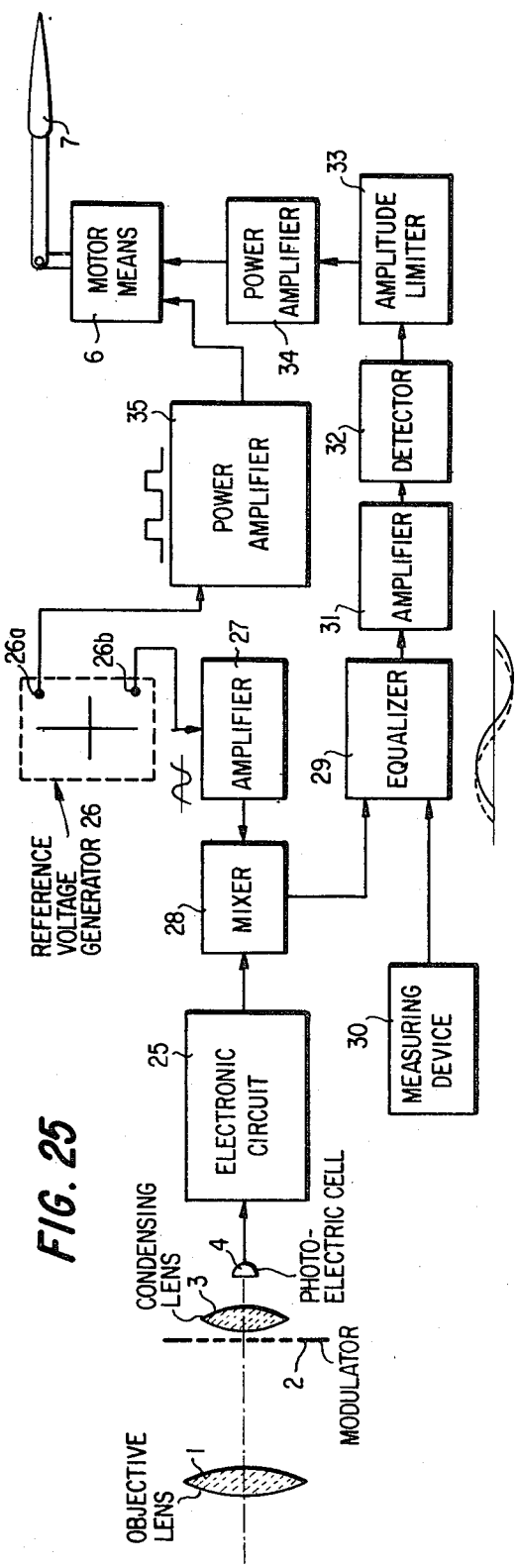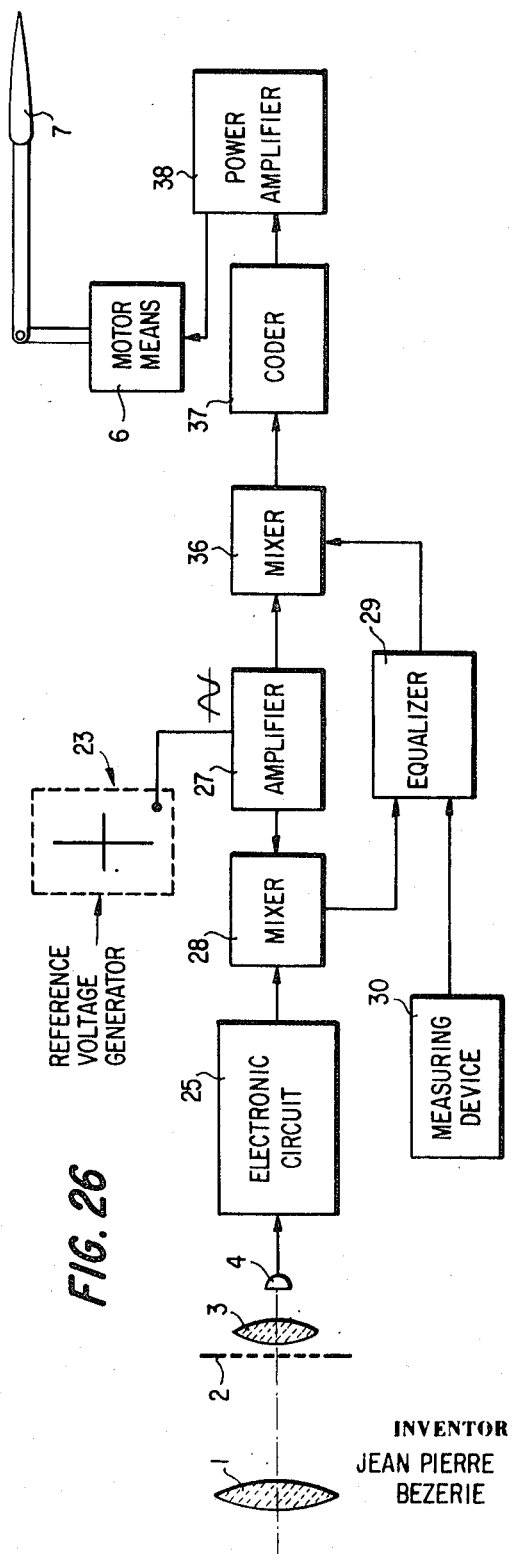

INVENTOR
JEAN PIERRE BEZERIE

SYSTEM FOR THE OPTICAL AUTOMATIC AND AUTONOMOUS GUIDING OF SELF-ROTATING MISSILES

The present application is a continuation-in-part of application Ser. No. 460,621, filed June 2, 1965, now abandoned and relates to an automatic and autonomous guidance system for autorotative missiles.

More particularly, it deals with an optical guidance system, which is carried by a missile of the type which spins about its rolling or longitudinal axis and which is designed to guide the missile automatically and without any outside intervention towards a target which emits either radiation within the visible spectrum or radiation within the invisible spectrum (infrared or ultraviolet radiation) or, alternatively, radiation within the entire range of both visible and invisible spectra.

The novel guidance system is based on a particular application of an optical direction detector of the frequency modulation type which includes an objective lens, an optical modulator which is provided with a succession of zones in the form of opaque sectors and transparent sectors arranged in alternate sequence and on which is projected the image of a radiation source (visible or invisible radiation), means for producing a relative movement between the image and the modulator, the relative movement being obtained either by means which produce the displacement of the image on a stationary modulator or by means whereby a movable modulator is displaced in its plane relative to the image which is in that case stationary, so that the image is transmitted through the modulator with a frequency variation, a photoelectric cell placed on the downstream side of the modulator which is energized at a certain frequency, and a frequency discriminator which supplies a control voltage which is dependent upon the certain frequency and upon variations thereof. The transmission results in a signal having a frequency variation which indicates and is a function of an angular deviation between the optical axis of the objective lens and the radiation path emanating from the source and directed through the lens so as to intersect the optical axis at the center thereof. The angular deviation results the image translating along a radius of the optical modulator with respect to the optical axis.

This invention utilizes the autorotational motion of the missile in order to obtain directly, that is to say without any special control means, the relative motion between the modulator and the target image. The invention further utilizes on board an autorotative missile detection means combined with means for generating orders which are caused to act upon a rudder which is designed to control the flight of the missile and to produce action in a single stationary plane relatively to the missile under the action of the above-mentioned orders.

In one preferred embodiment of the invention, the novel automatic optical guidance system is further characterized by the following features and combinations thereof.

The optical axis of the objective lens and the center or pole of the modulator of the position-detecting means are located on the autorotational axis of the missile.

The modulator of the position-detecting means is integral with the missile and rotates therewith and comprises radiating sectors having widths which progressively increase through an angle of 180° then progressively decrease through an angle of 180°, the variation in width being preferably (but not necessarily) a sinusoidal function.

The modulator is oriented in the missile in such a manner that the minimum width sector (maximum pitch of the modulator) makes a predetermined angle with the line of the plane of action of the flight-control rudder.

In the case of a flight-control operation of the "all or none" type (constant amplitude and time of control), the modulator includes a single ring of radiating sectors and the means for producing position-indicating signals includes, starting from the photoelectric cell which is located on the downstream side of the modulator, a preamplifier, a selective amplifier, an amplitude limiter and a frequency discriminator for discriminating the excitation frequency of the photoelectric cell while the means for elaborating the guidance order includes a voltage amplifier which is controlled by said excitation-frequency discriminator and which is followed by a detector, an amplitude limiter and a power amplifier which supplies current to the motor means of the flight-control system, the first three elements of the order-elaborating means producing "square wave" control signals.

In an alternative form, which makes it possible to obtain a flight-control operation of the amplitude-linearized type (modulus), the modulator includes a plurality of concentric rings all having the same radial width and each divided into sectors having widths which vary in a sine-wave cycle, the mean frequency of the signals generated by each ring of sectors increasing linearly with increasing radial displacement of the sectors from the center or pole of the modulator while the maximum frequencies (minimum pitch) of the signals generated by all the rings result from sector widths which are aligned on one and the same modulator radius which makes a predetermined angle with the flight-control sector.

In order to enable the missile to move with its longitudinal axis making with the tangent to its trajectory an angle of incidence even though an error voltage due to the characteristics of the guidance system is introduced into the signals which indicate the angular position of the target, provision is made for a reference generator controlled in dependence on a gyroscope and delivering a corrective voltage which nullifies the above-mentioned error voltage.

The equipment by means of which an autorotative missile with a flight-control system which produces dissymmetrical action and the operation of which is linear in time is permitted to move with an angle of incidence in opposition to the force of gravity, comprises in addition to the optical portion and the photoelectric cell: an electronic circuit including, starting from the photoelectric cell, a preamplifier-amplifier, an amplitude limiter, a frequency discriminator and ancillary circuits; a sinusoidal reference-voltage generator, the frequency of which is a function of the velocity of autorotation of the missile, for example a generator which is controlled in dependence on a gyroscope which in turn is utilized to indicate the autorotational velocity; an amplifier having two outputs and the input of which is connected to the generator; a mixer which is connected to the output of the electronic circuit and to one of the outputs of the amplifier; a retunable phase-to-carrier-wave delay equalizer (or any other arrangement for compensating the effects of variation in the autorotational velocity of the missile) connected to the output of the mixer; a device for measuring the frequency as dependent on the autorotational velocity of the missile and coupled to the aforesaid delay equalizer for the continuous tuning thereof as a function of the autorotational velocity; a second mixer which is coupled to the second output of the amplifier and to the output of the delay equalizer and the output of which is connected to the input of a coder for transforming the input sinusoidal voltage into polarized square waves having a width proportional to the instantaneous amplitude of the half-wave, the coder being coupled to a power amplifier which supplies current to the flight-control motor means.

In order to permit an autorotative missile with a flight-control system operating on the all-or-none principle (amplitude and time) and of the dissymmetrical action type to fly while maintaining an angle of incidence in opposition to the force of gravity, the voltage of the signal for indicating the angular position is regulated by two corrective voltages which are opposed to the voltage of the position-indicating signal and supplied by a single generator or by two separate generators.

In order to permit flight at an angle of incidence in opposition to the force of gravity by means of a flight-control system which operates on the all-or-none principle (amplitude and time) and which is of the dissymmetrical action type, the equipment comprises in addition to the optical portion and the photoelectric cell: means for producing two corrective voltages such as, for example, a generator having two outputs or two generators each having one output, one of the voltages being pulsatory with a frequency which is dependent on the autorotational velocity of the missile and being in the form of square waves of such a width that the resultant force developed in the flight-control motor means balances the weight of the missile while the other voltage having the same frequency as the first is an alternating-current sinusoidal voltage which is intended to be opposed to the voltage which results from the incidence; a mixer connected to the output of the above-mentioned electronic circuit and to the output of an amplifier connected to that output at which the corrective sinusoidal voltage is obtained; a chain including an amplifier whose input is connected to the delay equalizer, a detector, an amplitude limiter and a power amplifier connected to the flight-control motor means; and an amplifier whose input is connected to the output at which the square-wave pulsating voltage is obtained and the output of which is connected to the motor means.

In an alternative for which permits the possibility of employing a standard modulator with a single ring of sectors and with sectors of constant radial width, the photoelectric cell with its preamplifier and the condensing lens which are disposed on the downstream side of the modulator are held stationary by the stationary portion of a gyroscope while the modulator which is displaced offcenter with respect to the autorotational axis of the missile rotates with its shaft within the missile, for example through the intermediary of an epicyclic gear system of which one element is held stationary by the stationary portion of the gyroscope.

In another alternative form which also permits the possibility of employing a standard modulator with a single ring of sectors of constant radial width, the objective lens is displaced offcenter with respect to the longitudinal axis (autorotational axis) of the missile while the modulator which is centered on the longitudinal axis is held stationary by being joined to the stationary portion of a gyroscope, the complete assembly which is formed by the condensing lens, photoelectric cell and preamplifier of the photoelectric cell being secured to the missile by means of a tube (or any like supporting means of suitable design) which is centered on the longitudinal axis of the missile and which passes through a central open zone of the modulator (which can thus rotate about said tube), said tube being fixed at one end to a partition wall which extends from diametrically opposed portions of the tube to the wall of the missile where it is attached and in which is formed a window located on the axis of the above-mentioned objective lens and in oppositely facing relation to the modulator and which circumscribes the useful field of the objective lens.

Further particular features and characteristics of the invention will become apparent from the description which follows below, reference being made to a few examples of the novel system for the automatic and autonomous optical guidance of an autorotative missile which is designed to spin about its longitudinal axis, the examples being illustrated diagrammatically in the accompanying drawings, in which:

FIG. 1 represents an autorotative missile (for example of the surface-to-surface type) which has left its launching station and is traveling towards a target which either constitutes or is equipped with radiation source;

FIG. 2 is a cross-sectional diagrammatic view showing the general arrangement of the missile with its propulsion nozzle, flight-control means and automatic guidance system;

FIG. 3 is a front view of the field in the focal plane of the analyzing means, wherein the axis of the missile makes an angle with the missile-to-target direction;

FIG. 4 is a block diagram of one form of embodiment of the automatic guidance system of the "all or none" type;

FIG. 5 is a front view on a larger scale showing the modulator of the "all or none" system of FIG. 4;

FIG. 6 is a curve of variation of the signal frequency which is supplied in the event of deviation of the missile by the modulator of FIG. 5, wherein one cycle of this variation corresponds to one complete revolution of the missile about its own axis;

FIG. 7 represents the force which is applied to the flight-control means in relation to the signal frequency of FIG. 6;

FIG. 8 is a profile view of the optical portion of an alternative form of embodiment of the automatic guidance system of the "linear" type;

FIG. 9 is a view looking on the front and on a larger scale, showing the modulator of the system of FIG. 8;

FIG. 10 is a curve representing the variation, in steps, in the mean frequency obtained by means of the modulator of FIG. 9;

FIG. 11 is a diagram of the missile looking on the front and limited to the modulator of FIG. 9 (of which only a part has been shown) and to the flight-control vector;

FIG. 12 represents a curve of the voltage obtained by the analyzing system fitted with the modulator of FIG. 9 and a curve of the corresponding force applied to the flight-control system;

FIG. 13 is a vector diagram in the plane of the modulator for the demonstration of the operation of a flight-control unit which is controlled in constant amplitude, constant time, and dissymmetrical action;

FIGS. 14, 15 and 16 are respectively a curve of the analysis voltage collected in the case of FIG. 13, a curve of the force which controls the shape of simple square waves having a fixed amplitude and constant time and a curve of the force which controls the shape of symmetrical square waves;

FIG. 17 is a vector diagram in the plane of the modulator for the demonstration of the operation of a flight-control unit which is controlled in constant amplitude, variable time and either symmetrical or dissymmetrical action;

FIGS. 18 and 19 are respectively a curve of the analysis voltage collected in the case of FIG. 17 and a curve of the flight-control force in the form of simple square waves having fixed amplitude and variable time;

FIG. 20 represents a square-wave curve of the flight-control force having constant amplitude, variable time and symmetrical action;

FIG. 21 represents the curve of the flight-control force in the case of linearly variable amplitude control FIG. 22 is a general arrangement diagram showing the means for balancing incidence and gravity;

FIG. 23 is the voltage curve of the signal which appears at the output of the frequency discriminator of the equipment unit of FIG. 22;

FIG. 24 is the voltage curve of the reference signal in the case of the equipment of FIG. 22;

FIG. 25 is a block diagram of a flight-direction system of the type providing dissymmetrical control on the all-or-none principle (fixed amplitude and time) together with means for balancing incidence and gravity;

FIG. 26 is a block diagram of a flight-direction system of the type providing dissymmetrical control but linear in time, together with means for balancing incidence and gravity;

FIG. 29 is a front view of a modulator used in the embodiments of FIGS. 27 and 28 which has uniform width sectors;

FIG. 30 is a schematic view of the gyroscope as used in this invention.

Figure 27:
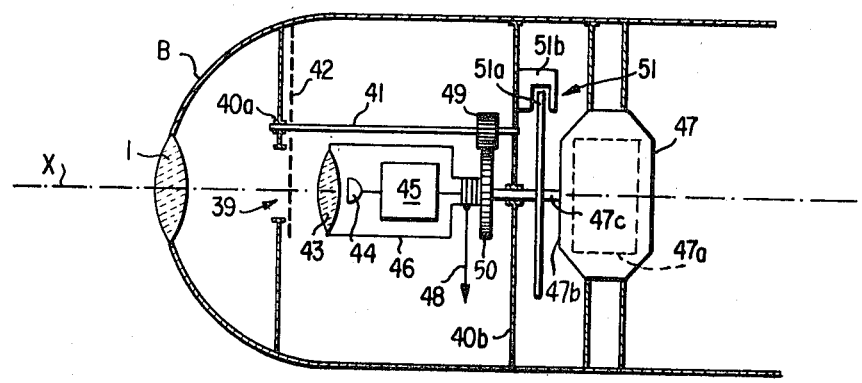
FIG. 27 is a diagram of an alternative form of a portion of a linear control system with a movable modulator.

For the sake of greater clarity, single wires have been shown in the majority of the circuit diagrams. In addition, all elements which are known to those versed in the art, particularly in the field of electronics, (e.g., amplifiers, amplitude limiters, detectors, frequency discriminators and the like) are not described in detail hereinafter and are simply represented schematically by blocks in the accompany drawings.

In FIG. 1 the reference character A designates a launching station (for example, for surface-to-surface flight) from which an autorotative missile B takes off for automatic self-guidance flight to a target C which emits either visible or invisible radiation.

As shown in FIG. 2, optical detection means are mounted on the autorotative missile for the purpose of detecting the deviation α between the direction of the optical axis X—X of said detection means (which coincides with the longitudinal axis of the missile) and the direction Z—Z of the radiation source or target C, the optical detection means including a centered objective lens 1, in the image plane of which is located a modulator 2 having alternately transparent and opaque radiating sectors, as will be described in greater detail hereinafter, there being located on the downstream side of the modulator a condensing lens 3 which focuses onto a photoelectric cell 4 the optical transmission which is generated at the modulator as a result of the image received by the modulator from the radiation source C.

The photoelectric cell 4 is connected to an electronic circuit 5 which delivers control signals to motor means 6 so as to actuate a single flight-control rudder 7 for deflecting a propulsion jet 8 which is discharged from a nozzle 9.

As long as the axis X—X coincides with the axis Z—Z ($\alpha=0$) or, in other words, when the missile B is oriented on the source C, the image of the source coincides with the center of the modulator 2.

When the axis X—X deviates from the axis Z—Z and makes, for example, an angle α with the axis Z—Z, the image $c$ of the target C describes in the plane $p$ of the modulator and therefore in the modulator 2 itself, a circle having a radius $\rho$ (which is a function of α); periodically, that is to say at each revolution of the missile about its longitudinal axis and in respect of a given position about the axis, the above-mentioned image $c$ makes a polar angle $\theta$ (FIG. 3), in the plane of the modulator, with respect to a reference axis (Y—Y).

It is on the basis of these two polar coordinates $\rho$ and $\theta$ that the automatic and independent guidance of the missile B is carried out. This guidance can be performed in accordance with the following systems:

1. "All-or-none" system (giving $\theta$ as sole variable);
2. System with linearity at $\rho$;
3. System with linearity at $\theta$;
4. System with linearity at $\rho$, $\theta$.

When the system is of the "all-or-none" type, the center 0 of the modulator 2, is located on the optical axis of the centered object-lens lens 1 and the modulator is integral with the missile B (or, in other words, the modulator rotates with the missile about the axis X—X).

The modulator 2 comprises (as shown in FIG. 5) transparent sectors 2a which are arranged in alternate sequence with opaque sectors 2b; the width of the sectors at any given radius varies sinusoidally and increases through an angle of 180° that is; a plot of sector width vs. time to traverse the width while making a complete traverse of the modulator (360°) would result in a plot which resembled a multiple cycle sine wave of varying or modulated frequency.

As long as the axis X—X coincides with the direction Z—Z of the radiation source C, the image C is located at 0 and no signal is produced. In the case of a deviation α 1, the image $c$ describes on the modulator a circle R1 and, in the case of a deviation α 2, describes another circle R2. By reason of the sinusoidal variation of the width of sectors 2a, 2b, a signal will be produced for each radius having a different modulated frequency $f$ (the cycle of which corresponds to one full revolution of the missile) which can be related to the particular α deviation.

Steps will be taken to ensure, for example, that the action of the flight-control rudder will respond to the maximum frequency of the signal generated at any given radius which occurs during the transmission through the minimum widths of sectors 2a, 2b. To this end, it is merely necessary to key the modulator 2 in the missile B in a suitable manner at the time of assembly, for example, so that the plane in which the flight-control rudder acts intersects modulator 2 at vector OG which in turn is directed along the sector of minimum width.

It can readily be visualized that the variation of the frequency $f$ of the signal is a sinusoidal voltage (as shown in FIG. 6), the maximum value of which corresponds to the passage of the vector $\overrightarrow{OG}$ in front of the image $c$.

By detecting this voltage and converting it into square signals (as shown in FIG. 7), there is obtained a square-wave voltage which is intended to initiate a rudder movement, the resulting action of which takes place in a single direction and symmetrically with respect to the instant at which the vector $\overrightarrow{OG}$ passes in front of the image $c$ and produces a restoring force F.

By applying the force F in synchronism with the monitoring of the α deviation, the missile is brought back to the direction which corresponds to the correct orientation of the missile along its flight path; that is, since the signal frequency is a function of modulator radius and since α is a function of modulator radius, then α can be related to frequency and monitoring the frequency by electronic circuit 5 results in monitoring α.

In order to produce the force F, the electronic circuit 5 comprises (as shown in FIG. 4), starting from the photoelectric cell 4, a preamplifier 11, a selective amplifier 12, an amplitude limiter 13, a frequency discriminator 14, a voltage amplifier 15, a detector 16, an amplitude limiter 17 and a power amplifier 18, the intended function of the elements 15, 16 and 17 being to shape the signals into square waves which are the flight-control orders supplied to the motor means 6 to actuate the rudder.

As is apparent from the foregoing, such an arrangement does not include any member which is movable with respect to the missile, is of extremely simple design, and is wholly suitable for self-directing autorotative missiles which are not required to have either high performances or a high degree of precision.

When the system is of the type which provides linearity at $\rho$ (as shown in FIG. 8), the electronic circuit is similar to that which has just been described in the foregoing, but the modulator is modified in the manner which is shown in FIG. 9, in which the modulator has been designated by the reference character 22. This figure shows that, instead of having, as in the case of the modulator 2 which is described above, a single "ring" of sectors 2a, 2b of sinusoidally varying width, the modulator 22 is divided radially into $n$ concentric rings 22a, 22b, ... 22m-2, 22n,-1, 22n wherein the width $\Delta\rho$ of each ring multiplied by $n$ corresponds to the radius $\rho$ max. of the modulator, each of these rings being divided into sectors which are opaque and transparent in alternate sequence and the width of which varies according to a sinusoidal law, the mean frequency in respect of each ring of sectors being different from that of the others and increasing linearly (from the center of the modulator to the exterior) with the range of the ring.

The above-mentioned increase in mean frequency can thus be written (FIG. 10):

$$\Delta f = \eta \cdot \Delta\rho$$

Finally, the orientation of the different rings is such that the maximum frequencies of the signals generated by rings are aligned on the flight-control vector $\overrightarrow{OG}$ to which there accordingly correspond:

—angularly and in respect of each ring, a maximum value of the signal frequency;
—radially, a practically linear increase in the frequency (this latter will in fact increase sharply each time the image $c$ passes from one ring to the next towards the edge of the modulator).

There can thus be detected:
—linearly, $\theta$;
—and $\rho$ with an approximate linearity which is better as the number of rings 22a–22n is greater.

In order to gain a clear understanding of the system, reference will now be made to FIG. 11 in which is is assumed that the missile is viewed from the front, the missile being partially represented by its modulator 22 and by the flight-control vector $\overrightarrow{OG}$, the direction of rotation of the complete missile being indicated by the arrow.

The position of the image $c$ of the radiation source or target C corresponds in FIG. 11 to a deviation α which is assumed to be constant (as shown in FIG. 8) and has, in the plane $p$ of the modulator, polar coordinates defined by a modulus $\rho$ and an argument $\theta$. It being assumed that the missile rotates at constant speed, the signal frequency will vary sinusoidally and will be at maximum value when the vector $\overrightarrow{OG}$ passes through the position $\overrightarrow{OG'}$ and will be at minimum when the vector passes through the position $\overrightarrow{OG''}$.

It will be seen below that these maximum and minimum values enable the guidance system which is mounted on the missile to locate directly the position of the target C. In fact, the position of the image c of said target in the plane p of the modulator is represented in the following manner by the voltage delivered by the frequency discriminator:

— the phase of the voltage relative to a direction taken as a reference is equal to the argument $\theta$;

— the amplitude of the voltage is virtually proportional to the modulus $\rho$ of the deviation (this proportionality being more accurate as the number of rings of sectors of the modulator is increased).

This is represented in FIG. 12, wherein:

— the top arrows indicate the angular positions of the vector $\overrightarrow{OG}$;

— the vertical lines "O" correspond to the zero reference phase;

— the two sine-waves correspond to the two voltages generated by positions of images having two different moduli.

If steps are taken to ensure that the flight-control rudder produces action when the projection of its plane of action onto modulator 22 coincides with the straight line $G'-G''$ and in a direction such that the flight-control rudder causes the missile to return to the target direction, the self-guiding action desired is thus achieved.

A number of modes of operation of the flight-control rudder can be contemplated.

The first case to be examined below will relate to the mode of operation which is referred to as "constant amplitude (displacement), constant time, dissymmetrical action."

In FIG. 13, which represents the image-plane of a modulator, there has been shown the image c of the target C which makes an angle $\theta$ with a reference point which is fixed in space.

The frequency discriminator which measures linearly the variations of the signal frequency produces a sinusoidal voltage $\Delta V$ (see also FIG. 14), the maximum value of which corresponds to $\theta$ and the minimum value of which corresponds to $\theta=\pi$.

In this case, the flight-control rudder will have a constant displacement $d$ between $\theta_1=\theta-\pi$ and $\theta_2=\theta+\pi$; In other words, the flight-control rudder will produce action with constant force in a single direction (for example $\overrightarrow{OG}$) for one half-revolution (as shown in FIG. 15). The rudder operates on the all-or-none principle insofar as amplitude and time are concerned inasmuch as it can only represent the argument $\theta$ without taking into account the amplitude (modulus) $\rho=0$ c of the deviation.

In an alternative form which is referred to as "symmetrical action," there corresponds to each half-wave of the voltage $\Delta V$ one square-wave displacement (see FIG. 16). The first displacement $d$ is in the direction $\overrightarrow{OG}$ and the second displacement is in the direction $-\overrightarrow{OG}$ and there are thus obtained as a result of the reversal of the flight-control rudder two resultant forces which produce action in the same direction.

In the mode of operation which is referred to as "constant amplitude, variable time, dissymmetrical action" (as shown in FIGS. 17 to 19), the flight-control rudder moves in one direction only with constant amplitude. The time-duration of the square wave $\theta_1$, $\theta_2$ (as shown in FIGS. 17 and 19) depends on the voltage $\Delta V 1$, $\Delta V 2$ which is delivered by the frequency discriminator and this time-duration is proportional to the deviation $0c$: for example, in the case of $0c_1 > 0c_2$ (or $\rho 1 > \rho 2$), we have $\theta_1 > \theta_2$.

In the alternative form of operation which is known as "symmetrical action" as shown in FIG. 20, we have a case which is similar to that which is described in reference to FIG. 16 but with variable-time square waves.

In the mode of operation known as "linearly variable amplitude," the flight-control rudder develops (as shown in FIG. 21) a force F which is directly proportional to the deviation $0c=\rho$.

In the two particular cases of FIGS. 15 and 19 in which the operation of the flight-control rudder is dissymmetrical, account must be taken of the fact that the missile is capable of flying in such a manner that the longitudinal axis thereof does not coincide with the tangent to its trajectory but makes with said trajectory an angle of incidence $\beta o$.

A missile, while following its trajectory or flight path towards a target C, would always "see" the target too low at an angle $-\beta o$ (as shown in FIG. 22) and there would accordingly result, due to the characteristics of the apparatus, a sinusoidal error voltage $\Delta Vo = \chi\beta o$ corresponding to a "low" deviation. It will be understood that, if such a voltage were to trigger an order for the flight-direction control system, this order would have a detrimental effect since the missile is theoretically on the correct flight path as determined by the optical modulator and its associated circuitry as pointed out above. Said error voltage must therefore be reduced to zero by opposing thereto a corrective voltage which is both equal and of opposite phase. Said corrective voltage can, as shown in FIG. 22, be supplied by a reference generator 23 which is associated with a gyroscope 24 of the missile B and the sinusoidal voltage of which $-\Delta Vo$ (FIG. 24) nullifies the error voltage $\Delta Vo$ (FIG. 23), the amplitude of the corrective voltage having the same value as that of the error voltage and therefore corresponding to an upward deviation $-\beta o$.

This false zero method thus makes it possible for the missile flight-control system to receive orders for the correct return of the missile about a position of equilibrium which makes an angle $\beta o$ with the flight path.

In addition, in order that the missile may be capable of flying at an angle of incidence $\beta o$, its flight-control system must also receive a constant cyclic order (one order per revolution of the missile about its longitudinal axis) which neutralizes the action of gravity. This cyclic order can be provided either by the reference generator 23 mentioned above which would be adapted to supply two corrective voltages, or from a second generator (in the case of FIG. 15).

In the case of a flight-control system which operates on the principle referred to as "constant amplitude and time and dissymmetrical action," the equipment which permits the possibility of neutralizing the action of the error voltage and gravity can be that which is shown in FIG. 25.

Said equipment includes, in addition to the elements 1, 2, 3, 4 which have already been described in the foregoing, an electronic circuit 25 (which includes the circuit elements shown in FIG. 4 ...), and a reference generator 26 having two outputs 26a and 26b.

The output 26a supplies a "high" signal in order to balance the force of gravity, in the form of a pulsating square-wave voltage having a frequency which corresponds to the autorotational velocity (spin velocity) of the missile, the width of the square waves being such that the resultant force which is exerted on the flight-control rudder balances the weight of the missile. The output 26b supplies a reference sinusoidal alternating-current voltage which is intended to be opposed to the voltage which results from the incidence (error voltage).

The output of the electronic circuit 25 and the output 26b of the generator are connected, the latter via an amplifier 27, to a mixer 28, the output of which is connected to a phase-to-carrier wave delay equalizer 29 which is also retuned by means of a device 30 for measuring the spin velocity of the missile; this measurement can be obtained either from the reference alternating current voltage (output 26b) or, for example, by means of an electromechanical unit which employs centrifugal force.

The delay equalizer is followed by an electronic chain which includes an amplifier 31, a detector 32, an amplitude limiter 33 (or a bistable device) for converting the detected signal into positive square waves, and a power amplifier 34 which supplies current to the motor means 6 for actuating the flight-control rudder 7. Said motor means also receive via a power amplifier 35 the pulsating square-wave voltage which is derived from the output 26a of the generator 26 and which balances the force of gravity.

In the case of a flight-control rudder, the operation of which is dissymmetrical and linear in time, the equipment described above can be simplified in the manner shown in FIG. 26.

In this embodiment, the same elements as in the previous form of embodiment are again shown, namely the elements 25, 27, 28, 29, 30, but the reference signal generator 23 only supplies a sinusoidal alternating-current reference voltage for the purpose of balancing the error voltage which is introduced by the incidence of the missile. After phase equalization, the signal which is delivered from the delay equalizer is applied, at the same time as the alternating-current reference voltage which is delivered from the amplifier 27, to a mixer 36 controlling a coder 37 which transforms the sinusoidal voltage supplied thereto into a pulsating voltage having the shape of polarized square waves, the width of which is proportional to the instantaneous amplitude of each positive half-wave of the sinusoidal alternating-current voltage. The coder 37 finally controls a power amplifier 38 which supplies current to the motor means of the flight-control device 7.

When, as has previously been seen, the missile is correctly aligned, it "sees" the target at an angle $-\beta o$ and the reference voltage corresponds to an angle of incidence $+\beta o$, with the result that the mixer 28 delivers a zero voltage. At the output of the mixer 36, there is again supplied the above-mentioned voltage corresponding to $+\beta o$ which, by virtue of the coder 37, initiates the transmission to the motor means 6 of the flight-control device 7 of a signal such that the developed force balances the weight of the missile by giving it an angle of incidence $+\beta o$ so that it continues to "see" the target at an angle $-\beta o$.

When the missile deviates from the position of equilibrium (direction deviation $-\beta o$), the mixer 28 delivers a sinusoidal voltage which corresponds to the modulus $\rho$ and to the argument $\theta$ of the deviation. After phase equalization, this voltage is added to that which corresponds to the term of gravity ($\rho o$) and there is thus obtained a new voltage corresponding to the vector sum $\vec{\rho}+\vec{\rho o}$. This new voltage is transformed by the coder 37 into an order, the phase of which is the argument of the sum and the time-duration of which is proportional to the amplitude of same sum.

When the flight-control rudder is of the linear operation type (as shown in FIG. 21), its action is symmetrical and its displacement is such that the instantaneous force which it develops is proportional to the control voltage. The equipment contemplated above is therefore simplified by virtue of the fact that the coder 37 may be eliminated.

In order to detect the angular position of the target relative to the missile, it is also possible in accordance with the invention to carry out an analysis which, instead of being of the all-or-none type (modulator of FIG. 5) or of the virtually linear type (or, more exactly, of the type providing variation by stages as obtained by means of the modulator of FIG. 9), is of the linear type. In this case also, the frequency modulation is obtained in a known manner by the relative periodic displacement (as a function of the spin velocity of the missile) between the target image and the modulator which is of a known type having sectors of uniform width.

A system of this type is shown in FIGS. 27 and 29 wherein those elements which follow the photoelectric cell preamplifier and which have already been described in reference to FIG. 26 have accordingly not been shown again.

In this particular form of embodiment, the condensing lens 43 is stationary. The modulator 42 (having sectors of uniform width) has a shaft 41 which is rotatably mounted in supports 40a, 40b of the missile B and which is displaced offcenter with respect to the axis X—X of said missile.

A window 39 which delimits the useful field of the objective lens 1 on the modulator is located in front of the modulator 42 and centered about the centerline of the missile. To the rear of the modulator is located a unit 46 which includes a condensing lens 43, a photoelectric cell 44 and a preamplifier 45, the unit being carried by a stationary portion 47a of a gyroscope 47.

FIG. 30 diagrammatically illustrates an embodiment of the gyroscope principle employed in this invention. Shaft 47c on which unit 46 is mounted is attached to the inner frame 47a of gyroscope 47, which in turn supports a rotor R for rotation about axis X—X. The gyroscope 47 has an outer frame 47b which is attached to the inner walls of missile B to rotate therewith. It is the rotations of the outer frame 47b and the rotor R that results in the stationary status of inner frame 47a which carries, in bearings 47d, a second inner frame 47e that supports the rotor R in bearings 47f.

Collecting-rings or slip-rings which cooperate with brushes and which are generally represented in schematic manner at 48 serve to couple the preamplifier with the electric elements which are integral with the missile. The movement of rotation of the modulator is effected by means of an epicyclic gear system in which one of the pinions 49 is keyed to the shaft 41 while the other pinion 50 is mounted on shaft 47c and is therefore integral with the stationary portion 47a of the gyroscope 47, the stationary portion 47a being also adapted to carry one element (disc) 51a of the reference voltage generator 51 while the other element 51b thereof is integral with the missile and rotates therewith. This relative motion between 51a and 51b generates a voltage which is a function of missile rotational velocity and which nullifies the incidence error voltage as mentioned above.

In this embodiment, successive rotations of image C about modulator 42 are not concentric (FIG. 29). It is this fact which permits the frequency of the resulting signal to be modulated, since as the image proceeds toward the outer edge of modulator 42 the sector widths encountered will vary and it is this variation, as explained above, which gives rise to a frequency modulation. The maximum frequency taking place at the point of each rotation furthest from the center of the modulator.

Figure 28:
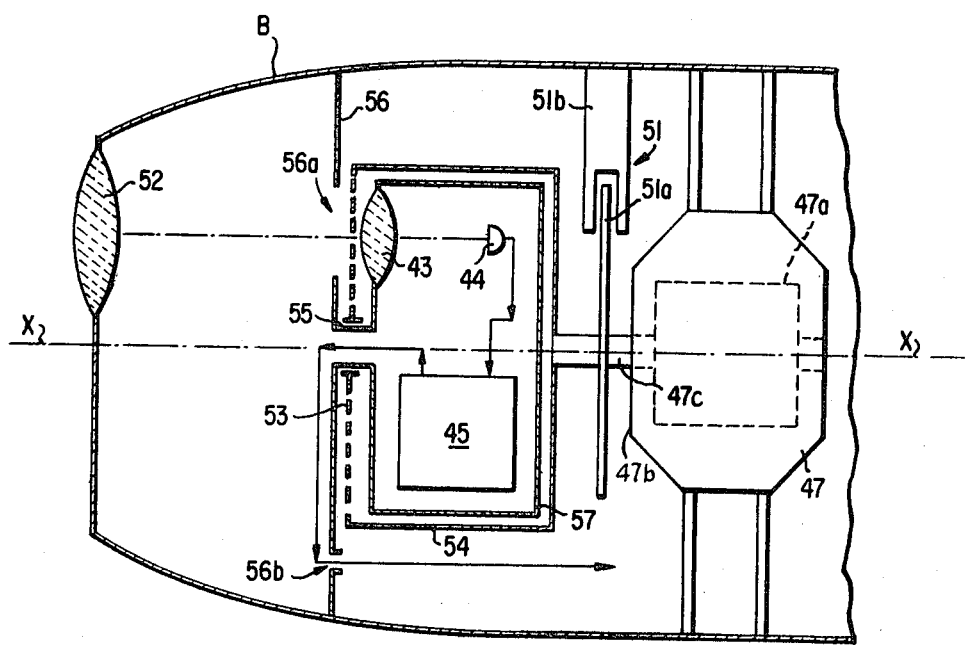
FIG. 28 is a diagram of another alternative form of a portion of a linear control system with a modulator of the type which fixed in space.

In another alternative form which also makes it possible to perform a linear analysis by means of a modulator including a single ring of sectors of constant width, the alternative form being shown diagrammatically in FIG. 28, the objective lens 52 is displaced offcenter relatively to the longitudinal axis X—X of the missile B while the modulator 53 which is centered on the axis is carried by a cage 54 which is integral with shaft 47c of the stationary portion 47a of the gyroscope 47.

The central zone of the modulator 53 has an open portion for permitting the insertion therethrough of a support tube 55 which is secured to a transverse partition 56 integral with the missile B and fitted with a picture-taking window 56a which is centered on the objective lens 52 and delimits the useful field of the said objective lens.

The tube 55 serves as a support for a casing 57 which is centered within the cage 54 and inside which are housed the condensing lens 43 which is placed on the optical axis of the objective lens 52 together with the photoelectric cell 44 which is placed on the downstream of the said condensing lens and the photoelectric cell preamplifier 45.

The leadout connections 58 of said preamplifier pass through the support tube 55 and an opening 56b formed in the transverse partition 56 so as to terminate in the remainder of the electronic equipment (not shown), thereby eliminating the collecting-rings and the connecting brushes of the preceding form of embodiment.

In this case also, the stationary portion 47a of the gyroscope 47 carries the element 51a of the reference voltage generator 51, the other element 51b of which is integral with the missile. The operation resulting in frequency modulation is similar to that described for FIG. 27 above.

It is apparent that the examples of application of the invention which have been described in the foregoing have been given without implied limitation and that any detail modifica-

What is claimed is:

1. An automatic and autonomous optical guidance system for an autorotative missile to be directed towards a target emitting radiations, the missile having a single flight control rudder operable at each revolution of the missile about its axis of rotation; said system comprising an optical target position detecting means for producing, at each revolution of the missile, signals which are a function of the deviation between the autorotational axis of the missile and the missile-target direction; control signal producing means connected to said optical-detecting means for generating, at each revolution of the missile, a control signal; and motor means connected to said control signal producing means to receive said control signal and adapted to be positively coupled with the single flight-control rudder in order to guide the missile, at each revolution thereof, as a function of the deviation between its autorotational axis and the missile-target direction; said optical target position detecting means comprising an optical modulator disposed perpendicular to the axis of rotation of the missile and supported in the missile for rotation and provided, radially from a center point, with a succession of opaque sectors and transparent sectors arranged in alternate sequence, said optical modulator being disposed in the image plane of an objective lens which projects the target image onto said image plane, and a photoelectric cell located downstream of said optical modulator for receiving light pulses generated by a relative displacement between the target and said optical modulator, the frequency of said pulses being a function of said deviation between the axis of rotation of the missile and the missile target direction, said photoelectric cell converting said light pulses into electric signals which are transmitted to a frequency discriminator producing an output voltage which is a function of the frequency of said pulses, thereby a function of the angular deviation of the target with respect to a reference direction constituted by the optical axis of the optical target position detecting means, said voltage actuating the control signal producing means; said relative displacement between said optical modulator and said target image being produced by the autorotational movement of the missile.

2. The guidance system of claim 1 further comprising gyroscope means mounted in the missile and having a stationary part, a corrective voltage producing generator having a rotative part attached to the missile and a nonrotative part coupled with said stationary part of said gyroscope means, said generator being connected in circuit with said control signal producing means for delivering thereto a preset corrective voltage to nullify an error voltage generated by said optical target position-detecting means as a function of the angle of incidence defined by the longitudinal axis of the missile with the tangent to its trajectory.

3. The guidance system of claim 1, further comprising a generator for producing a sinusoidal reference-voltage the frequency of which is dependent on the spin velocity of said missile; an amplifier having two outputs the input of which is connected to said generator; a mixer connected to the output of said optical target position detecting means and to one of the outputs of said amplifier; a retunable retunable phase-to-carrier-wave delay equalizer connected to the output of said mixer; a device for measuring the frequency as dependent on the spin velocity of said missile and coupled with said delay equalizer for the continuous tuning thereof as a function of said spin velocity; a second mixer coupled with the second output of said amplifier and with the output of said delay equalizer; a coder connected to a power amplifier and coupled with said second mixer for converting the sinusoidal input voltage into polarized square waves having a width which is proportional to the half-wave.

4. The guidance system of claim 1, further comprising generator means with two outputs for delivering two corrective voltages, the voltage delivered by the first output being a pulsating voltage at a frequency dependent on the spin velocity of the missile and being in the form of square waves, the other voltage having the same frequency as the first and delivered by the second output as an alternating current sinusoidal voltage; a mixer having two inputs, one of which is connected to the second output of said generator means, the other of said inputs being connected to the output of a frequency discriminator of said optical target position detecting means; means for measuring the spin velocity of the missile; a phase-to-carrier wave delay equalizer having two inputs connected respectively with said mixer and with said spin velocity measuring means; a detector connected by an amplifier to the output of said delay equalizer; an amplitude limiter connected with the output of said detector; a first power amplifier connected to the output of the amplitude limiter; a second power amplifier connected to the first output of the said generator means; a flight control motor means for actuating the rudder and having two inputs connected respectively with said first and second power amplifiers.

5. The guidance system of claim 1 wherein the optical axis of the objective lens and the center point of said modulator are disposed on the autorotatable axis of the missile, said modulator having alternately transparent and opaque radial sectors with widths progressively increasing through an angle of 180° and then progressively decreasing through an angle of 180° to revert to the initial width, the angle variation being a substantially sinusoidal function.

6. The guidance system of claim 1 wherein said optical modulator has a plurality of annular zones concentric to said center point which is located on an axis coincident with the optical axis of said objective lens, each zone having alternately transparent and opaque radial sectors which form angles progressively increasing through an angle of 180° then progressively decreasing through an angle of 180° so as to revert to the initial angle, the sector angle variation being a substantially sinusoidal function, each zone also having the number of sectors increasing linearly the further that said zone is removed radially from said point with the narrowest sectors of all of the zones being aligned on said same radius.

7. The guidance system of claim 1, further comprising a gyroscope having a first part affixed to the wall of the missile, a second part mounted in said first part about an axis in coincidence with the missile axis and carrying a gyroscope rotor, said second part being stationary with respect to said axis, and a shaft integral with and extending from said second part and coaxial with said axis; a stationary unit carried by said shaft including a condensing lens, photoelectric cell and a preamplifier; a modulator axle parallel to said shaft, carrying said optical modulator and journaled in missile supports at its ends; and transmission means for operatively coupling said modulator axle with said shaft so that said optical modulator describes one revolution for each revolution of the missile.

8. The guidance system of claim 1, further comprising a gyroscope having a first part affixed to the wall of the missile, a second part mounted in said first part about an axis in coincidence with the missile axis and carrying a gyroscope rotor, said second part being stationary with respect to said axis, and a shaft integral with and extending from said second part and coaxial with said axis; means attached to said shaft for mounting said optical modulator thereon; a supporting unit including a condensing lens, photoelectric cell and a preamplifier; and means coincident with said axis for supporting said supporting unit and about which said optical modulator is centered, said means being fastened to a pair of missile partitions with one of said partitions having an opening therein; said condensing lens and said photoelectric cell being aligned with said opening in said one of said partitions.

* * * * *